United States Patent
Quinn et al.

(10) Patent No.: US 10,155,149 B2
(45) Date of Patent: Dec. 18, 2018

(54) ELECTRIC GOLF SKATE CADDY VEHICLE

(71) Applicant: Fuel Limited, Labuan (MY)

(72) Inventors: Mathew Quinn, Springwood (AU); Daniel Quinn, Springwood (AU)

(73) Assignee: Fuel Limited, Labuan (MY)

( * ) Notice: Subject to any disclaimer, the term of this patent is extended or adjusted under 35 U.S.C. 154(b) by 0 days.

(21) Appl. No.: 14/399,595

(22) PCT Filed: May 3, 2013

(86) PCT No.: PCT/AU2013/000463
§ 371 (c)(1),
(2) Date: Nov. 7, 2014

(87) PCT Pub. No.: WO2013/166543
PCT Pub. Date: Nov. 14, 2013

(65) Prior Publication Data
US 2015/0136506 A1    May 21, 2015

(30) Foreign Application Priority Data

May 8, 2012    (AU) ................................ 2012901876

(51) Int. Cl.
*A63C 17/28*    (2006.01)
*A63C 17/01*    (2006.01)
(Continued)

(52) U.S. Cl.
CPC ............ *A63C 17/012* (2013.01); *A63B 55/60* (2015.10); *A63B 55/61* (2015.10); *A63C 17/12* (2013.01);
(Continued)

(58) Field of Classification Search
CPC . B62B 2202/406; A63C 17/011; A63C 17/28; A63C 17/12
(Continued)

(56) References Cited

U.S. PATENT DOCUMENTS 2,706,008 A * 4/1955 Voigt ...................... B62B 3/001
                                                    180/19.2
4,538,695 A * 9/1985 Bradt .................. B60L 11/1805
                                                    180/19.2
(Continued)

FOREIGN PATENT DOCUMENTS

WO    2011091979 A1    8/2011

OTHER PUBLICATIONS

Golf Skate Caddy [retrieved on May 28, 2013] Retrieved from internet <URL:http://web.archive.org/web/20111015181906/http://www.golfskatecaddy.com.au/>, published Oct. 2011 as per Wayback Engine, Whole website, Website advertising the claimed invention, 5 pages.

*Primary Examiner* — Jeffrey J Restifo
(74) *Attorney, Agent, or Firm* — Blank Rome LLP (57) ABSTRACT

The invention relates to a vehicle having a deck, a plurality of wheels mounted to the deck, a drive system mounted underneath the deck, an energy storage system that provides power to the drive system, and a frame configured to secure a load mounted to the deck. Particularly, the vehicle is an electric vehicle in the form of an electric skateboard for us in golf environments. The frame of the vehicle is adapted to secure and carry a golf bag, as well as various accessories, and enables an operator to traverse a golf course together with their golfing equipment on the vehicle.

27 Claims, 11 Drawing Sheets

(51) Int. Cl.
*B60K 1/00* (2006.01)
*B62K 3/00* (2006.01)
*B60L 1/14* (2006.01)
*B60L 11/18* (2006.01)
*B60K 1/04* (2006.01)
*A63C 17/12* (2006.01)
*B62M 9/16* (2006.01)
*A63B 55/60* (2015.01)
*B62K 5/00* (2013.01)

(52) U.S. Cl.
CPC .............. *B60K 1/00* (2013.01); *B60K 1/04* (2013.01); *B60L 1/14* (2013.01); *B60L 11/1805* (2013.01); *B60L 11/1864* (2013.01); *B60L 11/1877* (2013.01); *B62K 3/002* (2013.01); *B62M 9/16* (2013.01); *A63B 2055/601* (2015.10); *B60K 2001/001* (2013.01); *B60K 2001/0438* (2013.01); *B60L 2200/22* (2013.01); *B60L 2250/12* (2013.01); *B60L 2250/16* (2013.01); *B60Y 2200/23* (2013.01); *B62K 2005/002* (2013.01); *B62K 2204/00* (2013.01); *Y02T 10/7005* (2013.01); *Y02T 10/7061* (2013.01)

(58) Field of Classification Search
USPC ........................ 180/180, 181; 280/DIG. 5
See application file for complete search history.

(56) References Cited

U.S. PATENT DOCUMENTS

| | | | | |
|---|---|---|---|---|
| 4,848,504 A * | 7/1989 | Olson | .............. | B62B 5/0026 180/19.1 |
| 4,874,055 A * | 10/1989 | Beer | .............. | B62B 5/0026 180/19.2 |
| 5,020,621 A * | 6/1991 | Martin | .............. | A63C 17/01 180/180 |
| 5,137,103 A * | 8/1992 | Cartmell | .............. | B62B 3/001 180/13 |
| 5,161,635 A * | 11/1992 | Kiffe | .............. | B60B 33/00 180/19.3 |
| 5,167,389 A * | 12/1992 | Reimers | .............. | B60L 11/18 180/19.1 |
| 5,180,023 A * | 1/1993 | Reimers | .............. | B60L 11/18 180/167 |
| 5,265,686 A * | 11/1993 | Machen | .............. | B62B 3/001 180/169 |
| 5,265,695 A * | 11/1993 | Piazzi | .............. | B62D 51/02 180/208 |
| 5,307,889 A * | 5/1994 | Bohannan | .............. | B62D 51/008 180/13 |
| 5,346,028 A * | 9/1994 | Cassano | .............. | B62K 5/027 180/19.2 |
| 5,350,982 A * | 9/1994 | Seib | .............. | B60L 11/1805 280/DIG. 5 |
| 5,363,934 A * | 11/1994 | Edmund | .............. | A61G 5/045 180/6.5 |
| D353,698 S * | 12/1994 | Stevens | .............. | 280/47.35 |
| 5,375,673 A * | 12/1994 | McCall | .............. | B62B 3/12 180/13 |
| 5,893,425 A * | 4/1999 | Finkle | .............. | A63C 17/01 180/180 |
| 5,899,284 A * | 5/1999 | Reimers | .............. | B62B 1/042 180/11 |
| 5,944,132 A * | 8/1999 | Davies | .............. | A63B 24/0021 180/168 |
| 6,276,470 B1 * | 8/2001 | Andreae, Jr. | .............. | B62D 51/04 180/11 |
| 6,467,560 B1 * | 10/2002 | Anderson | .............. | A63C 17/01 180/181 |
| 6,474,427 B1 * | 11/2002 | Tunnecliff | .............. | B62B 5/0026 180/19.1 |
| 6,659,208 B2 * | 12/2003 | Gaffney | .............. | B62D 51/04 180/19.2 |
| 6,662,887 B2 * | 12/2003 | Agutter | .............. | B62B 5/0026 180/11 |
| 6,749,214 B2 * | 6/2004 | Shieh | .............. | B62B 3/022 280/47.34 |
| 7,021,408 B2 * | 4/2006 | Fricker | .............. | A63B 55/61 180/19.1 |
| 7,021,413 B1 * | 4/2006 | Lee | .............. | B62K 3/002 180/180 |
| 7,086,491 B2 * | 8/2006 | Matte | .............. | A61G 5/042 180/21 |
| 7,322,434 B1 * | 1/2008 | Hussain | .............. | B62H 1/12 180/180 |
| 7,537,076 B2 * | 5/2009 | Falkiner | .............. | A63B 55/61 180/208 |
| 7,866,428 B1 * | 1/2011 | Oliver | .............. | B60N 2/14 180/208 |
| 8,365,850 B2 * | 2/2013 | Gal | .............. | A63B 55/087 180/19.1 |
| 8,905,175 B2 * | 12/2014 | Chang | .............. | G05D 1/0011 180/167 |
| 2004/0016582 A1 * | 1/2004 | Ho | .............. | B60K 6/36 180/181 |
| 2005/0056476 A1 * | 3/2005 | Jung | .............. | B62K 3/002 180/181 |
| 2007/0205034 A1 * | 9/2007 | Wier | .............. | A63C 5/085 180/181 |
| 2015/0014076 A1 * | 1/2015 | Azizi | .............. | A63B 55/08 180/181 |
| 2015/0136506 A1 * | 5/2015 | Quinn | .............. | B60K 1/00 180/180 |

\* cited by examiner

ELECTRIC GOLF SKATE CADDY VEHICLE

FIELD OF THE INVENTION

The invention relates to an electric vehicle. In particular, the invention relates, but is not limited, to a electric vehicle for golf environments, preferably an electric skateboard type vehicle capable of traversing a golf course with an operator and golfing apparatus.

BACKGROUND TO THE INVENTION

Reference to background art herein is not to be construed as an admission that such art constitutes common general knowledge in Australia or elsewhere.

Various motorised vehicles are known for traversing land. Different vehicles have been developed for different uses and terrain. More recently, motorised skateboards have been developed. These are typically driven by an electric motor that the operator controls while standing on a deck of the skateboard.

To date problems associated with traction, distance and terrain have contributed to limiting motorised skateboards from being used in outdoor environments, such as on a golf course. For example, not having sufficient traction can result in the wheels spinning and skidding on terrain, particularly if the terrain is loose or wet. This is not only dangerous to the operator and those nearby, but on a golf course this is particular undesirable as the terrain, and in particular maintained grass surfaces (e.g. the fairway or greens), may be damaged.

Having insufficient power and torque to traverse hills means the skateboard may be unable to travel where desired. This is inconvenient to the operator, and in a golf course environment may result in an operator having to walk large distances on unlevel terrain to reach the desired location (e.g. where their ball has landed, or where tee-off occurs). A further issue is that when stopped on an incline (e.g. to get or hit a ball), the skateboard may not be able to provide sufficient torque to start moving on the incline again. It has also been found that increasing the motor size to provide additional power and torque presents further problems, such as belts between the motor and the wheels slipping.

Not having sufficient battery power to enable an operator to travel sufficient off road distances can result in the operator being stranded. Furthermore, in a golf course environment this may result in the skateboard not being able to traverse the desired number of holes.

Not having sufficient clearance can result in non-wheeled portions of the skateboard, such as the deck, engaging with the ground. This not only affects ride quality, but can be dangerous as it may suddenly decelerate, or even leverage, the vehicle. Furthermore, terrain damage is almost certain to occur.

Another limitation of motorised skateboards is the limited load capacity. While they can convey an operator, they are not suited to carrying additional loads, such as baggage, tools, or other apparatus. Any additional loads that an operator wants to take must be able to be carried, or at the very least held, by the operator.

Golf carts are a known and generally accepted motorised vehicle for traversing golf courses. They have four wheels, two seats, and space for at least two golf bags. They are relatively stable and capable of traversing most of the off-road terrain presented by a golf course at moderate speeds. However, golf carts have their limitations.

Typically two players share a golf cart, but this means they both have to travel to the same location at the same time. For example, they may hit their balls in two completely different directions, but they cannot travel to them simultaneously. After travelling to one ball it is then necessary to travel to the other ball. After travelling to the first ball the second ball may be more difficult, or even impossible, to locate. Furthermore, the additional travelling and waiting slows the game down. This in turn limits when another set of players can start on a particular hole and, consequently, limits how many players can play on a golf course at any one time.

Alternatively, if each player has their own golf cart then traffic congestion may be problematic on the golf course. For example, four golf carts would need to be parked at each tee off and green location and, inevitably, further groups may catch up to another group meaning that double, or even triple, the number of vehicles may need to find places to park while waiting. A further problem is that twice as many golf carts are required which puts an increasing burden on the golf course operator. For example, they would need to purchase and maintain twice as many golf carts, and then also provide parking and security for the increased number of golf carts when not in use.

OBJECT OF THE INVENTION

It is an aim of this invention to provide an electric vehicle which overcomes or ameliorates one or more of the disadvantages or problems described above, or which at least provides a useful alternative.

Other preferred objects of the present invention will become apparent from the following description.

SUMMARY OF INVENTION

According to a first aspect of the invention, there is provided a vehicle comprising:
a deck upon which an operator can stand;
a plurality of wheels mounted to the deck;
a drive system mounted underneath the deck;
an energy storage system that provides power to the drive system; and
a frame mounted to the deck, wherein the frame is configured to secure a load.

The vehicle is preferably an electric vehicle with an electric drive system and an electrical energy storage system. The electric drive system preferably includes an electric motor, even more preferably a direct current (DC) motor. The energy storage system is preferably a battery, even more preferably a high capacity lithium-ion battery. The battery preferably has a capacity of between 9 and 36 Ah, even more preferably between 12 and 24 Ah, even more preferably between 16 and 20 Ah, and in a preferred form of approximately 18 Ah.

In a more preferred heavier duty form, the battery preferably has a capacity of between 13 and 52 Ah, even more preferably between 18 and 34 Ah, even more preferably between 24 and 28 Ah, and in a preferred form of approximately 26 Ah. The battery may comprise a plurality of electrically connected smaller batteries. The battery is preferably housed within a casing mounted to the underside of the deck. Preferably the casing has a quick release mechanism that allows access to the battery.

The drive system preferably includes a power transfer mechanism that transfers power from the motor to the wheels. The power transfer mechanism preferably includes a drive belt. The drive belt preferably engages directly with a rotor of the motor and a drive portion of a wheel axle between two of the wheels. The rotor and drive portion of the axle preferably have teeth and the drive belt preferably has corresponding teeth that engage with the teeth of the rotor and the drive portion of the axle. The rotor of the motor is preferably smaller in diameter than the drive portion of the axle.

The drive system preferably includes a belt tensioning system. Preferably the belt tensioning system is adjustable. The belt tensioning system preferably includes at least one protruding member that engages with the belt between the rotor and the drive portion of the axle. The protruding member is preferably a roller that can rotate when the belt moves. Preferably two protruding members are provided. Preferably the protruding members of the belt tensioning system are configured to keep the drive belt engaged with the rotor and the drive portion of the axle.

Preferably the load secured by the frame is an item of baggage, even more preferably a golf bag. Preferably the frame carries the load on the vehicle. Even more preferably the frame, comprises a base and a support member. The base is preferably mounted on an upper surface of the deck and has a flange portion. The flange portion preferably extends around the perimeter, or at least a portion of the perimeter, of the base. The support member preferably extends substantially perpendicularly from the base or from the deck adjacent the base. Alternatively, the support member may extend at an angle from the deck, but preferably at an angle no less than 45°, and even more preferably no less than 60°. The support member preferably has a support bracket that extends transversely to the support member. The support bracket preferably engages with the load in use.

A fastener may be provided. Preferably the fastener is attached to the support member, even more preferably to the support bracket. The fastener is preferably a strap, even more preferably an adjustable length strap with a releasable clip. The fastener preferably engages with and holds a load when in use. The load is preferably a golf bag and, when being carried by the frame, the fastener preferably goes around the golf bag and holds it against the support bracket. Preferably access to the golf bag, particular to the clubs, is not inhibited.

There are preferably four wheels mounted to the deck. The deck preferably extends between a front pair and a rear pair of wheels. The front pair of wheels and rear pair of wheels are preferably substantially inline. Preferably the front wheels are steerable and the rear wheels are driven wheels. The deck is preferably substantially rectangular. Preferably the deck has cut-out portions adjacent the wheels. There are preferably four cut-out portions, one in each corner of the deck.

Preferably the vehicle comprises an electronic controller. Preferably the electronic controller is a wireless controller. The wireless controller preferably communicates with a receiver in electronic communication with the drive system to transmit signals that control the drive system. The wireless controller preferably communicates digitally with the receiver. The wireless controller and receiver preferably utilise unique identifiers that prevent interference from other wireless controllers. The wireless controller and receiver preferably use an unlicensed frequency band, such as 2.4 GHz, and may utilise a standard communication protocol such as Bluetooth.

Preferably the vehicle is steered by the operator moving their weight from side to side and/or by the operator leaning on the support member. The vehicle preferably includes skateboard trucks for steering. The skateboard trucks are preferably mounted to the underside of the deck. The underside of the deck may also have stops adjacent the truck to limit turning.

Preferably the vehicle further comprises a seat, a drink holder, an umbrella holder, a scorecard holder, a ball holder, a tee holder, a bucket holder, a control panel, a thermally insulated compartment, forward lighting, brake lighting, and/or mudguards. Preferably the thermally insulated compartment is a cold box wherein the seat is attached to, or integrally formed with, the lid of the cold box. Preferably the seat and thermally insulated compartment is removably mounted to the rear of the deck.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
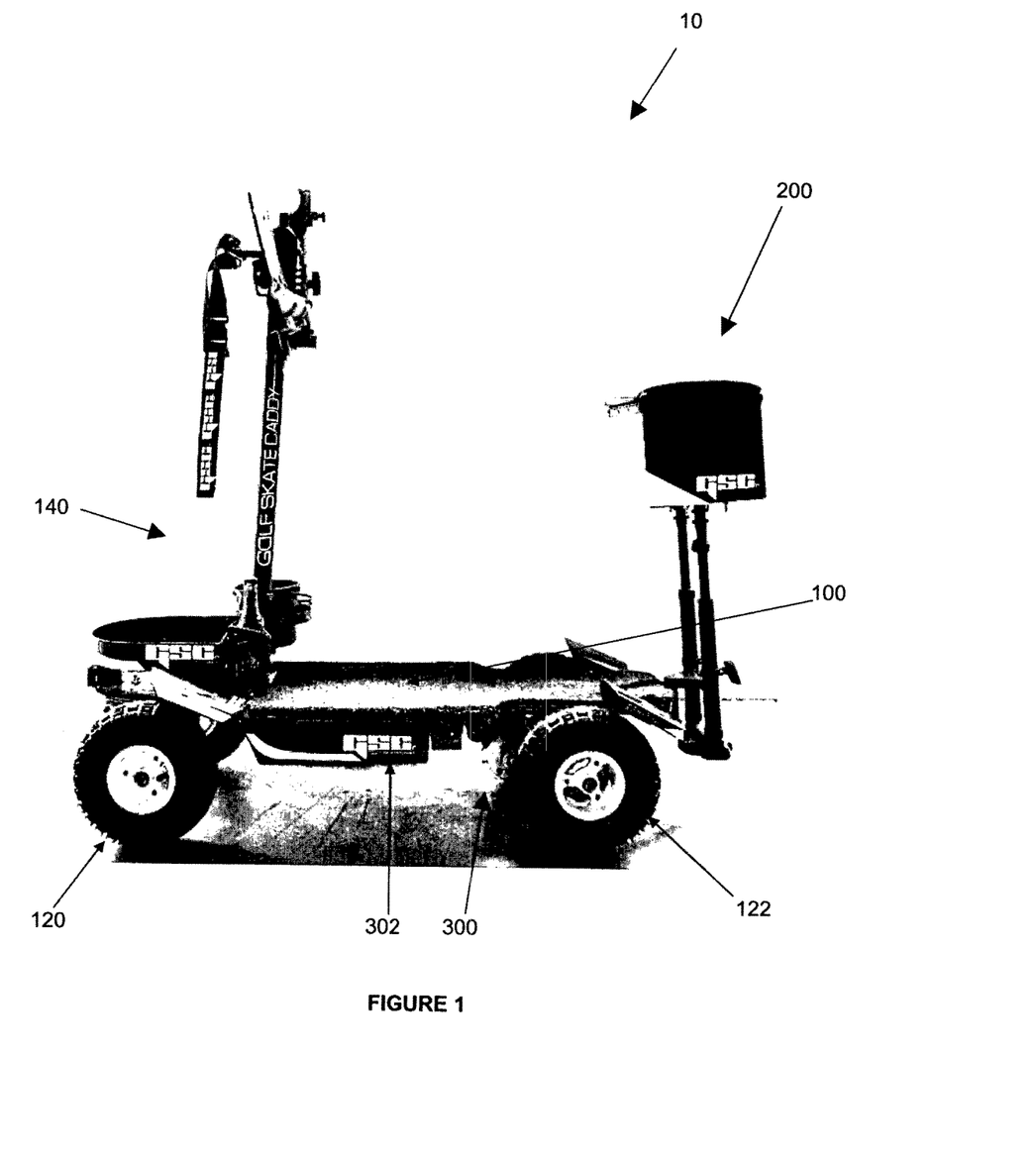
FIG. 1 is a side elevation view of the vehicle embodied as an electrically powered golf skateboard.
Figure 17:
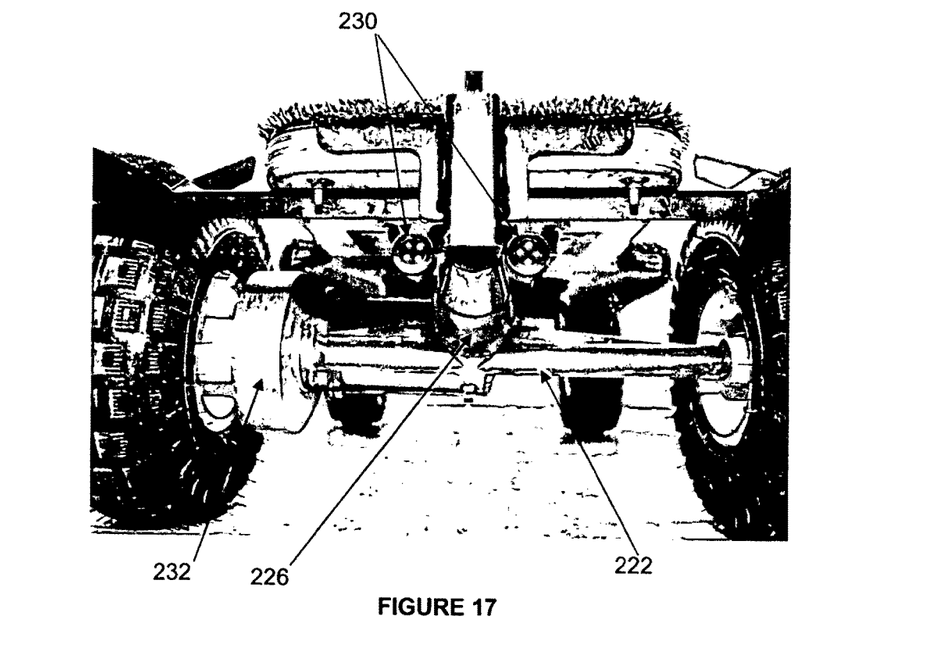
FIG. 17 is a rear elevation view of the lower rear of the vehicle shown in FIG. 1.
Figure 18:
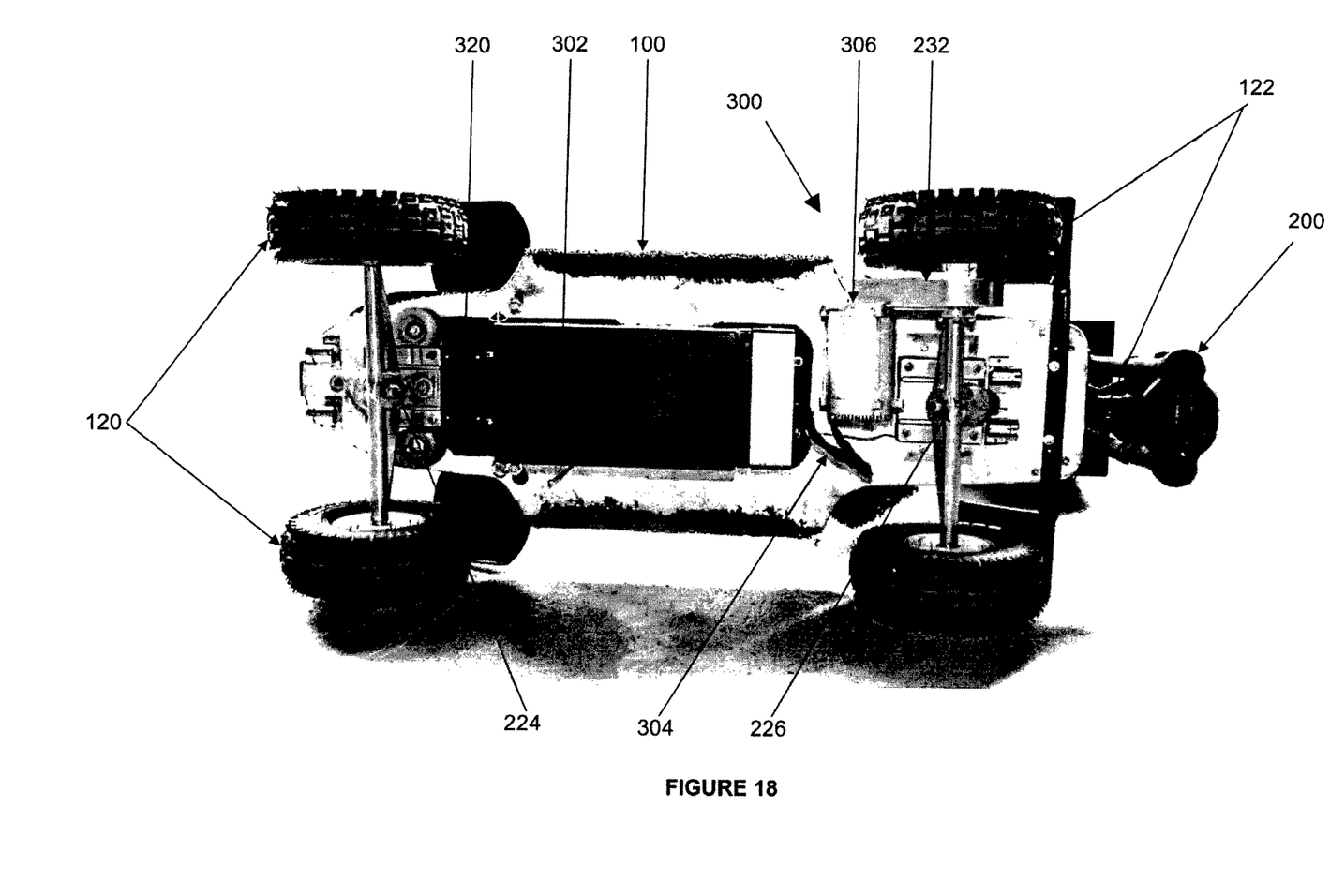
FIG. 18 is an underside view of the vehicle shown in FIG. 1.

FIG. 1 illustrates a side view of an electric vehicle 10 in the form of a powered skateboard for use on a golf course. The vehicle 10 has a deck 100, front wheels 120, rear wheels 122, a frame 140, and a seat assembly 200. Underneath the deck 100, best seen in FIGS. 17 and 18, is a drive system 300 and an energy storage system in the form of a battery 302. In the illustrated embodiments, battery 302 includes a casing that houses a lithium battery. The casing and battery will be collectively referred to as battery 302 for the sake of convenience.

Figure 2:
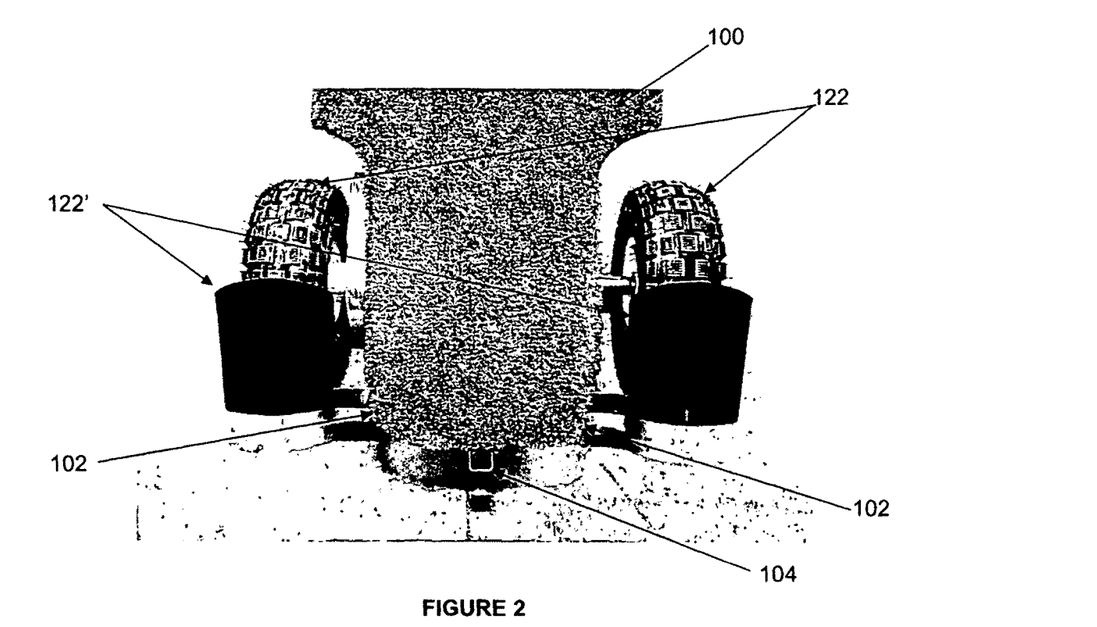
FIG. 2 is a plan view of a rear end portion of the vehicle shown in FIG. 1.
Figure 3:
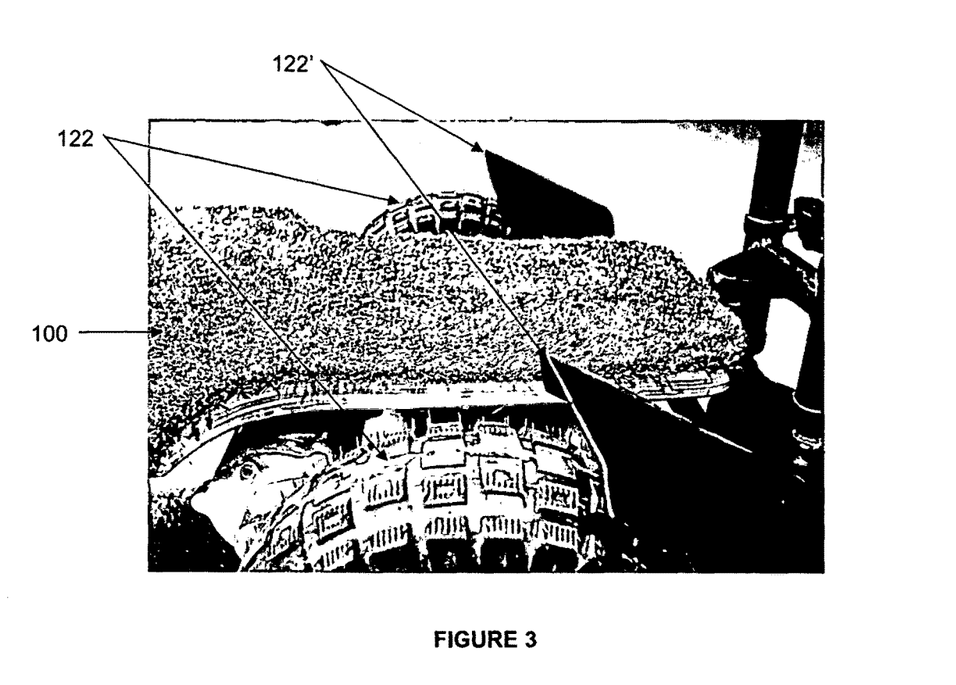
FIG. 3 is a view of the rear end portion shown in FIG. 2.

Turning to FIGS. 2 and 3, a rear end portion of the vehicle 10 is shown which has the deck 100 with rear wheels 122 and rear wheel guards 122'. In the illustrated embodiment the deck has a non-slip surface in the form of artificial grass. It will be appreciated that other non-slip surfaces could be utilised such as rubber. Between the artificial grass and the upper surface of the deck is a waterproof membrane to prevent ingress of water through any upper surfaces of the board.

The deck 100 has cut-out portions 102 in which the rear wheels 122 are located. Similar cut-out portions 102 in the deck 100 are provided for the front wheels 120. Provided on an end of the deck 100 is a mount 104 for removably mounting components which will be discussed in further detail with reference to FIGS. 12 to 15.

Figure 4:
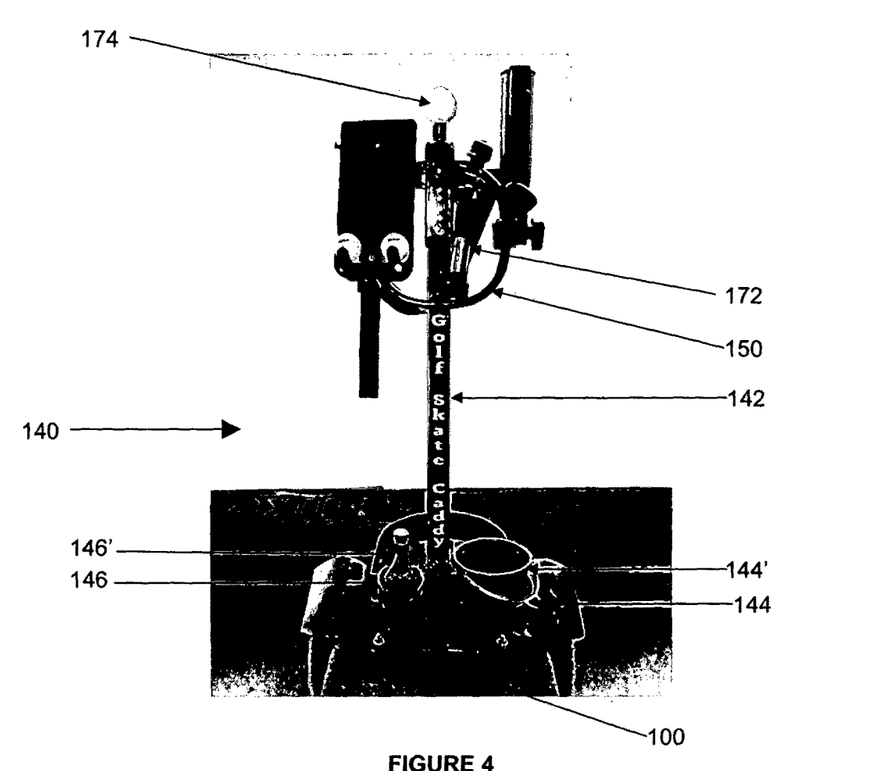
FIG. 4 is elevation view of a front portion of the vehicle shown in FIG. 1.

FIG. 4 shows a front portion of the vehicle 10 including a front portion of the deck 100, the front wheels 120, and front wheel guards 120'. The front portion has the frame 140 which includes a support member in the form of a pole 142. The pole 142 is mounted to the deck 100 and extends substantially vertically when the deck is substantially horizontal. At a lower portion adjacent the pole 142 is a bucket holder 144 holding a bucket 144' and a beverage holder 146 holding a bottle 146'. The bucket holder 144 and beverage holder 146 are disposed on a base portion of the support pole 142.

At an upper end of the support pole 142 is an accessory holding portion including an accessory ring 150. As seen more clearly in FIG. 5, the support pole 142 and accessory ring 150 have a control panel 152, an umbrella holder 160, a score-card holder 162, a bell 168, and a remote holder 170.

Figure 5:
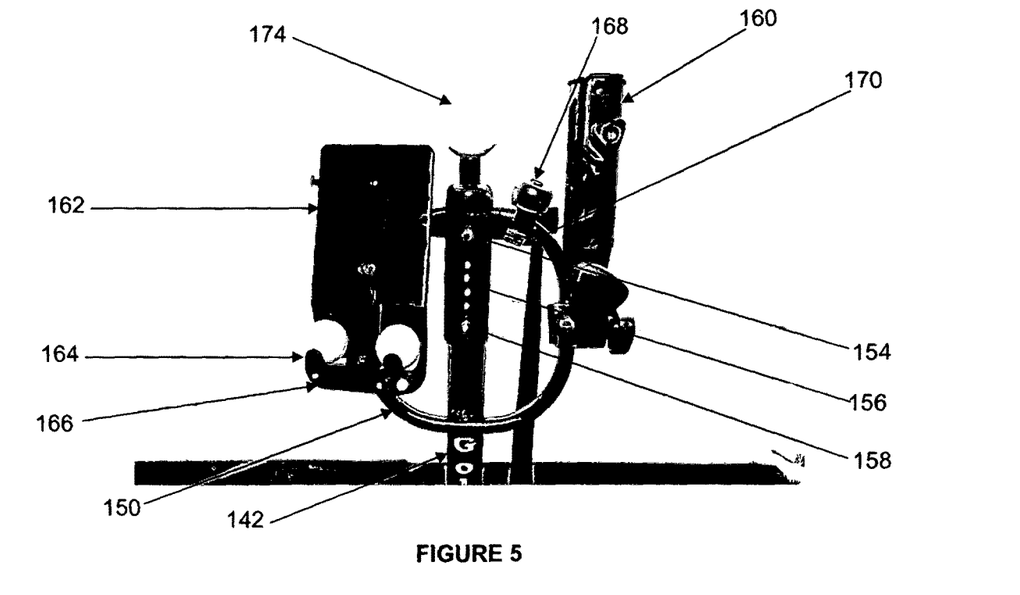
FIG. 5 is a close-up view of an upper front portion of the vehicle shown in FIG. 1.

The control panel 152 has a power switch 154, indicator LEDs 156, and an auxiliary switch 158. All switches are waterproof with an IP67 rating. The indicator LEDs 156 are typically used to display remaining battery power and the auxiliary switch 158 is typically used to toggle lights. The score-card holder 162 includes a golf ball holding portion 164 and a tee holding portion 166. The remote holder 170 is illustrated in FIG. 5 without the remote and in FIG. 4 holding a wireless trigger operated remote 172. In a preferred embodiment the remote holder 170 is a holster (not shown). At an upper end of the support pole 142 is a knob 174 which can be held by an operator and used for steering the vehicle 10.

Figure 6:
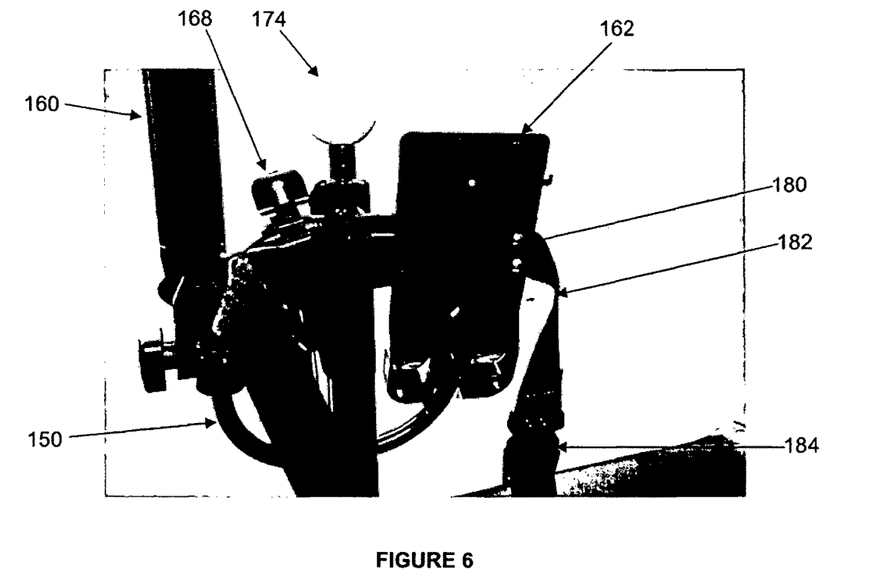
FIG. 6 is a view of the other side of the portion shown in FIG. 5.

FIG. 6 shows the front side of the support pole 142 at an upper end. Provided on the front side of the support pole 142 is a support bracket 180. The support bracket 180 is welded to the support pole 142 and has a fastener in the form of a strap 182 which has a releasable clip 184. The strap 182 is length adjustable and can be opened and closed using the clip 184. The support bracket 180 and strap 182 are used to secure an upper end of a golf bag (not shown) to the vehicle 10.

Figure 7:
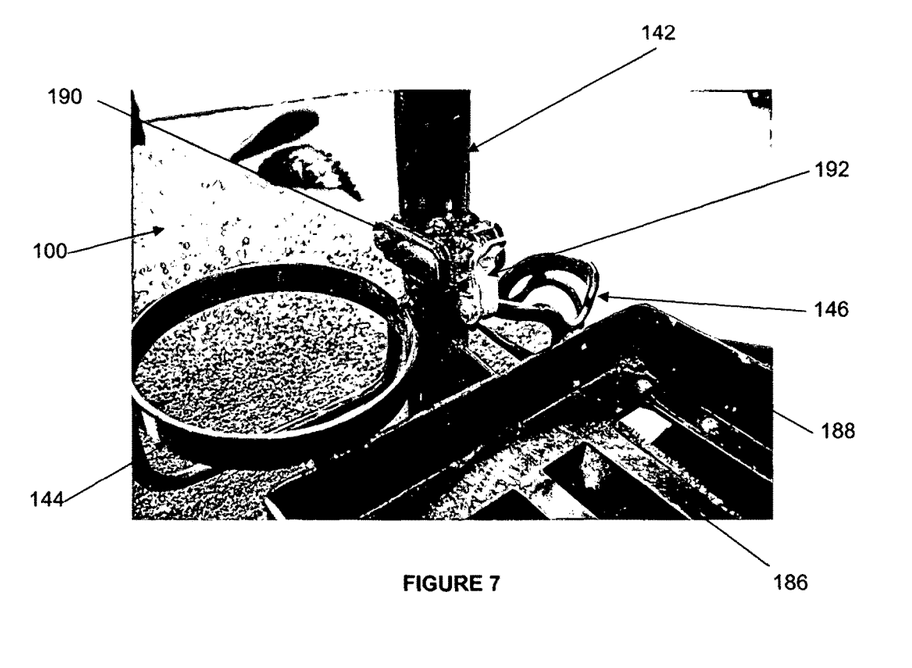
FIG. 7 is a close-up view of a lower front portion of the vehicle shown in FIG. 1.

FIG. 7 shows a base portion of the support pole 142. The base portion includes a base 186 with a raised flange 188 around its perimeter. The base 186, which is more clearly illustrated in FIG. 8, is used to support the weight of the golf bag (not shown) from below and the flange 188 is used to hold the bottom of the golf bag in place.

Also shown in FIG. 7 is a hinge assembly 190 near the base of the support pole 142 which has a releasable locking mechanism 192 which rigidly holds the support pole 142 in the upright position and allows hinged movement of the support pole 142 about hinge assembly 190 when released.

Figure 8:
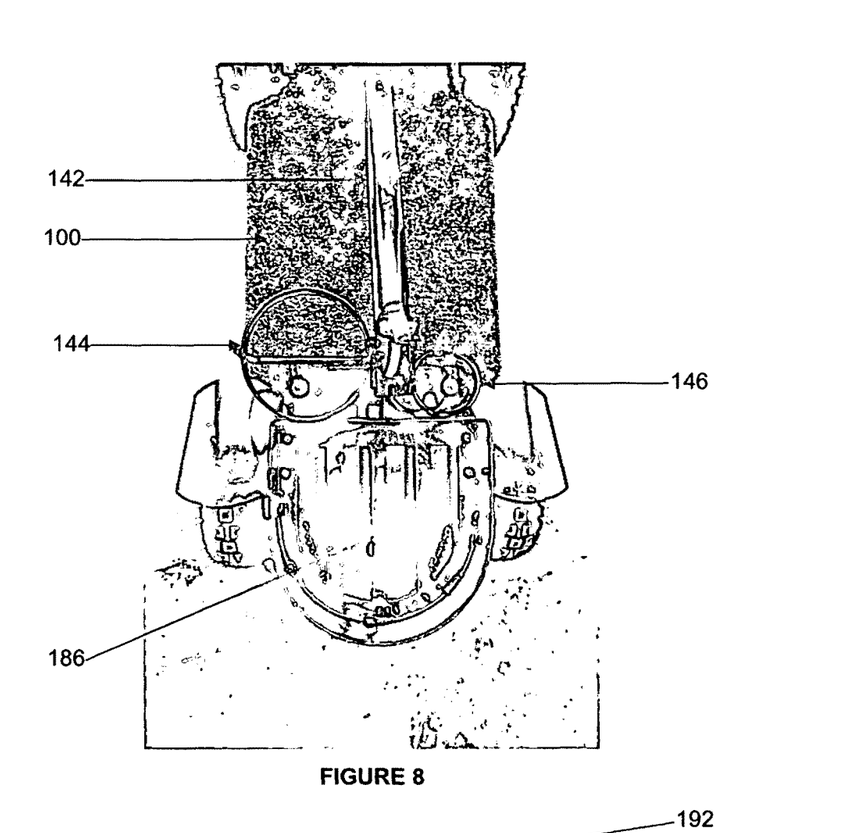
FIG. 8 is a plan view of a front end portion of the vehicle shown in FIG. 1 in a collapsed position.
Figure 9:
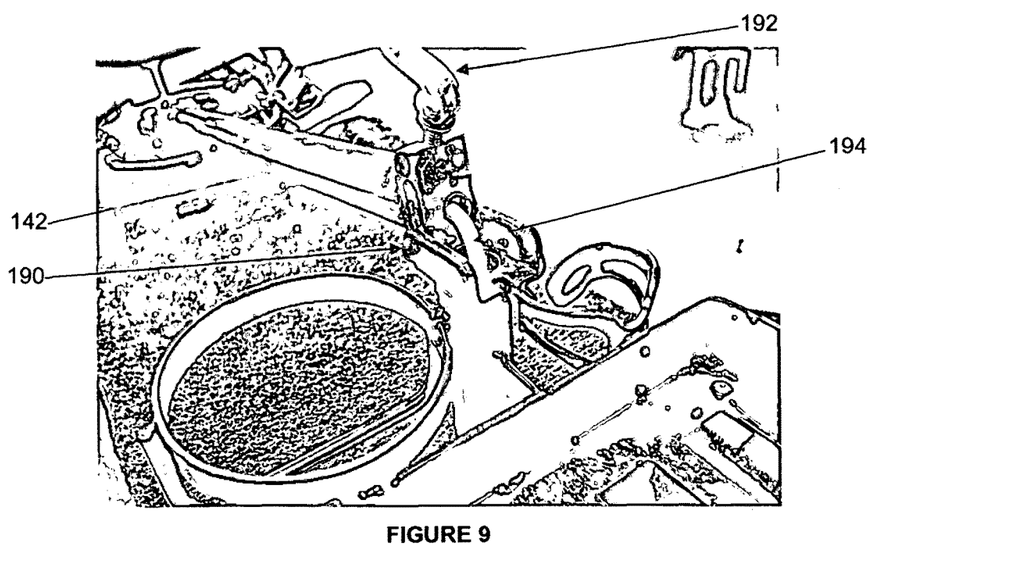
FIG. 9 is a view of the view shown in FIG. 7 in a collapsed position.
Figure 10:
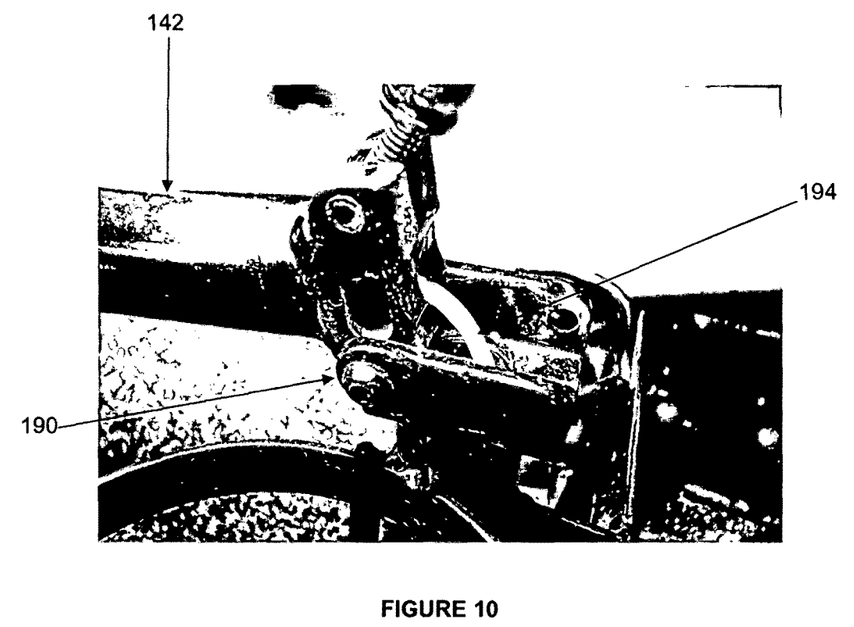
FIG. 10 is a close-up view of a portion of the view shown in FIG. 9.

The support pole 142 can then be folded to a collapsed position, as shown in FIGS. 8 to 10, for compactness and transportation. With the support pole 142 folded the entire vehicle 10 can fit inside the luggage compartment of most road vehicles (e.g. cars). As seen most clearly in FIG. 10, an electrical cable 194 runs through the support pole 142 to provide power and communication to the control panel 152.

Figure 11:
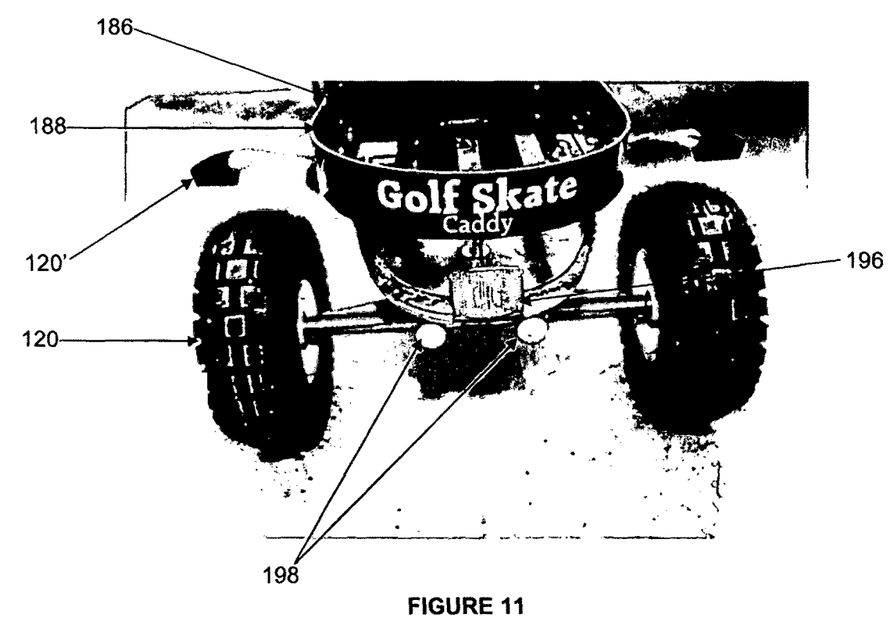
FIG. 11 is a lower front view the of the vehicle shown in FIG. 1.
Figure 12:
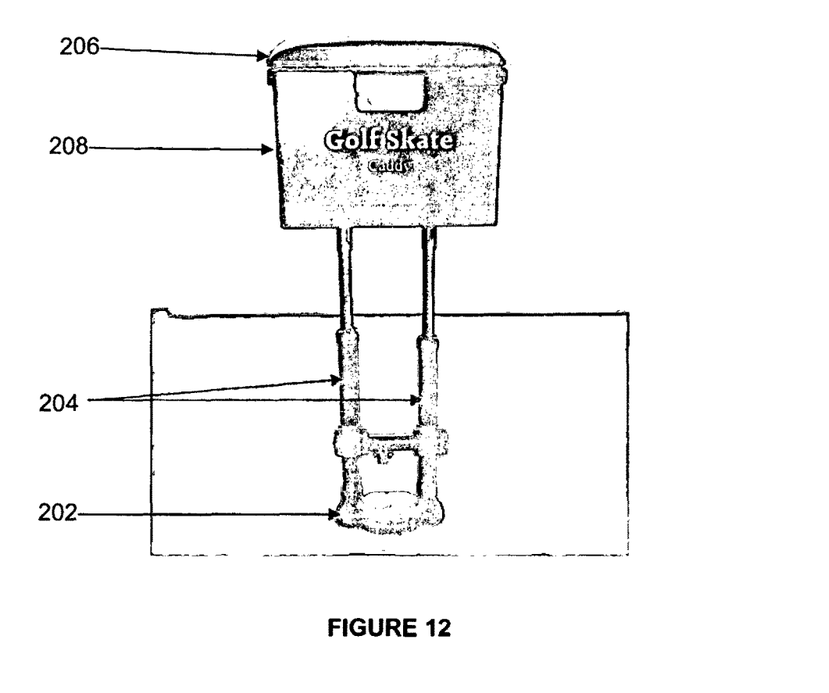
FIG. 12 is a view of a removable seat and storage container in a removed position.
Figure 13:
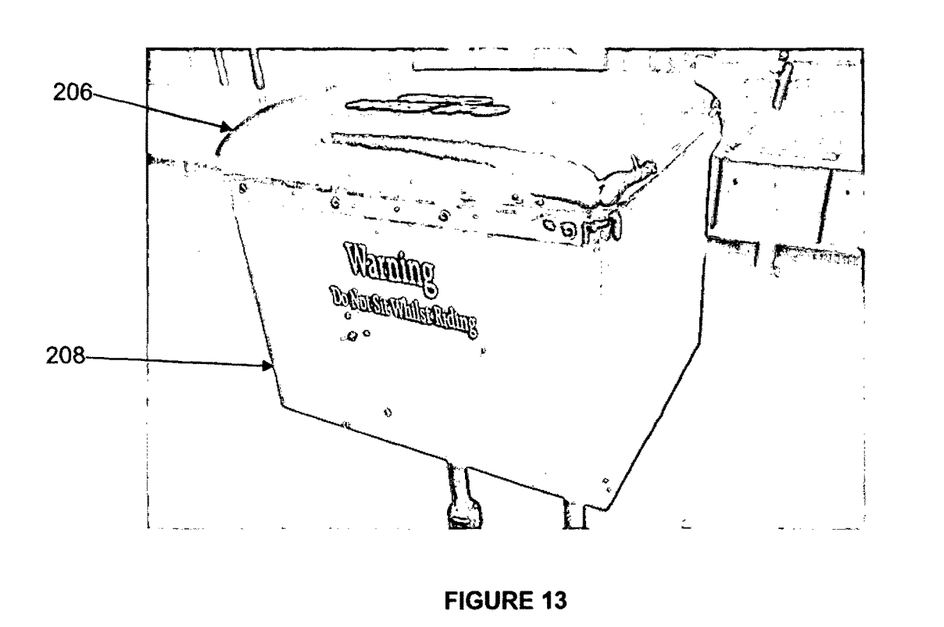
FIG. 13 is a close up view of the seat and storage container shown in FIG. 12.

FIG. 11 shows the front of the vehicle 10 including a reflector 196 and forward facing white LED lights 198. As seen most clearly in FIG. 11, the base 186 is raised from the deck 100, typically by approximately 50 mm, to allow an operator to put their foot under the base 186 when operating the vehicle 10.

Figure 14:
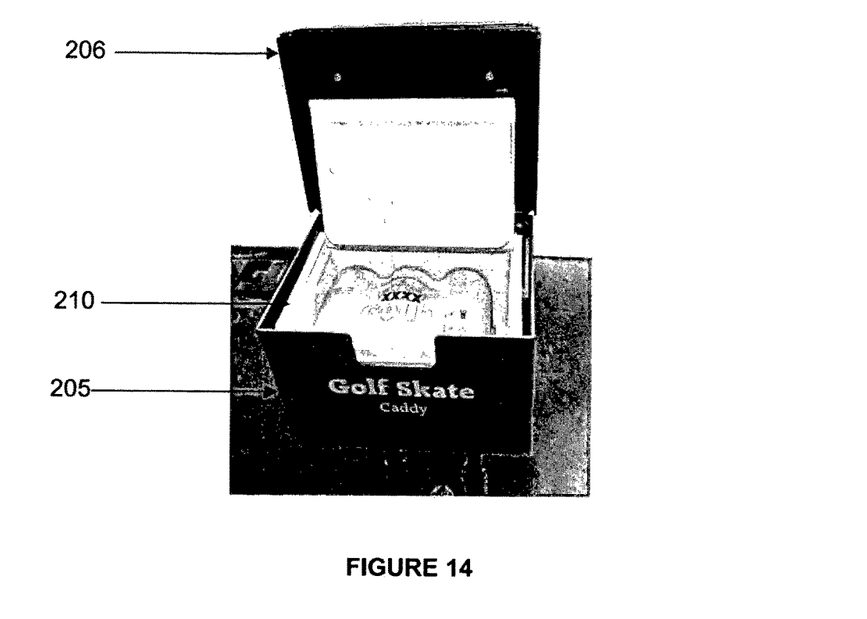
FIG. 14 is a view of the storage container of FIG. 12 in an open position.
Figure 15:
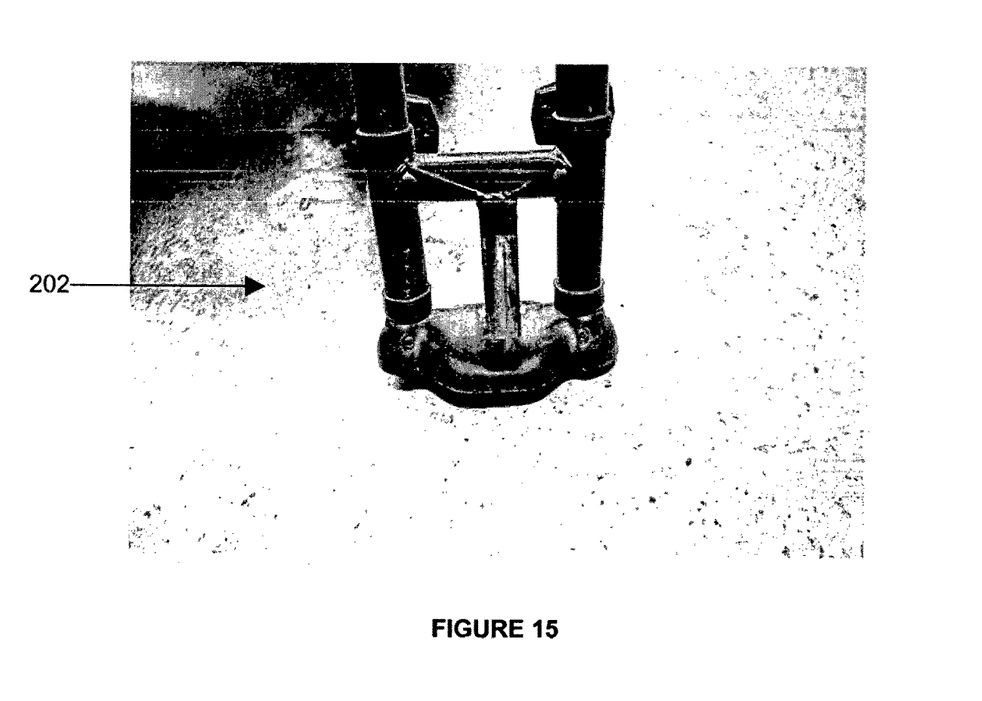
FIG. 15 is a view of a mounting portion of the removable seat and storage container shown in FIG. 12.

FIGS. 12 to 15 show the removable seat assembly 200 which can be mounted on the mount 104 shown in FIG. 2. The removable seat assembly 100 includes a mounting portion 202, shock absorbing legs 204, a seat 206, and a storage portion 208. The storage portion 208 can be used to store various items but, as shown in FIG. 14, in the illustrated embodiment it contains a thermally insulated cold box 210. The cold box 210 is sized to allow transportation of six refreshing beverages. FIG. 15 shows the mounting portion 202, which is a quick release mechanism for locking the seat assembly 200 to the mount 104 shown in FIG. 2.

Figure 16:
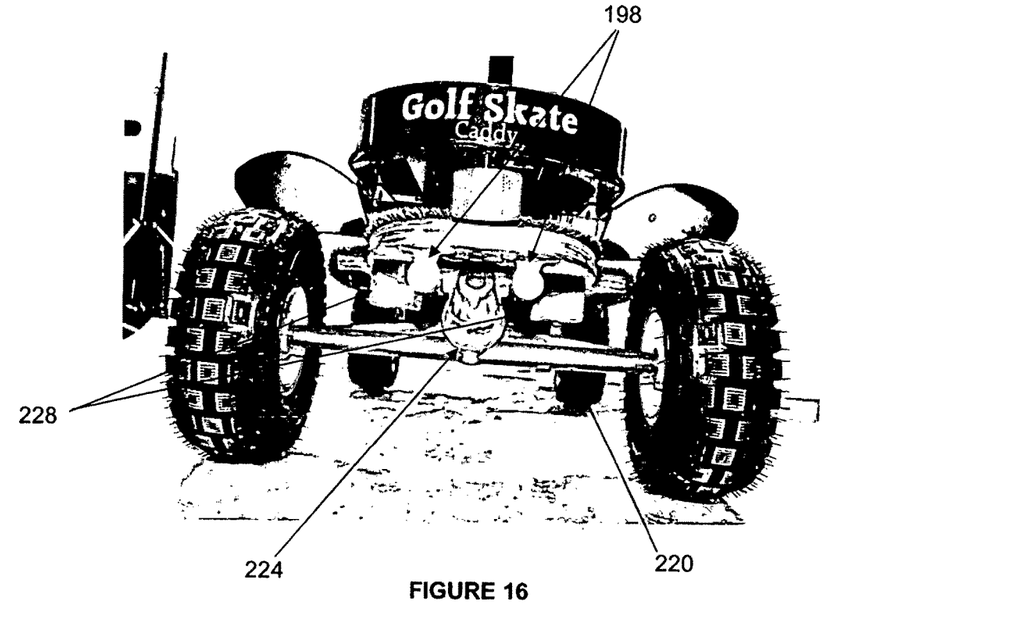
FIG. 16 is a front elevation view of the lower front of the vehicle shown in FIG. 1.

FIG. 16 is a lower front view of the vehicle 10 which shows a front axle 220 between the front wheels 120. FIG. 17 is a lower rear view of the vehicle 10 which shows rear axle 222 between the rear wheels 122. The front axle 220 is mounted to a front truck 224 and the rear axle 222 is mounted to a rear truck 226. Adjacent the front axle 220 are two stops 228 which limit turning of the vehicle 10 to ensure stability. The front has forward facing white LED lights 198 and the rear has rear facing red LED brake lights 230. Also visible in FIG. 17 is a drive belt guard 232.

FIG. 18 illustrates an underside view of the vehicle 10 including the drive system 300 and battery 302. The battery is a lithium battery, preferably with a capacity of approximately 26 Ah, electrically connected to the drive system 300 by cable 304. The drive system 300, and in particular the battery 302, is designed to provide enough power to traverse 27 holes of a golf course. This allows for a typical 18 hole golf game to be played with additional power to spare. Drive system 300 includes an electric motor 306 and a power transfer system including a drive belt 308 (see FIG. 19) protected by the drive belt guard 232.

Also located underneath the deck 100 is a wireless receiver 320 which wirelessly communicates with the remote 172. The remote 172 and wireless receiver 320 communicate over the 2.4 GHz unlicensed frequency band using digital communication protocols such as Bluetooth. This allows remotes and wireless receives to have unique identifiers and to be paired digitally to prevent interference when multiple remotes and vehicles 10 are operating in close proximity. The remote has a limited range to prevent inadvertent control of the vehicle from a large distance.

Figure 19:
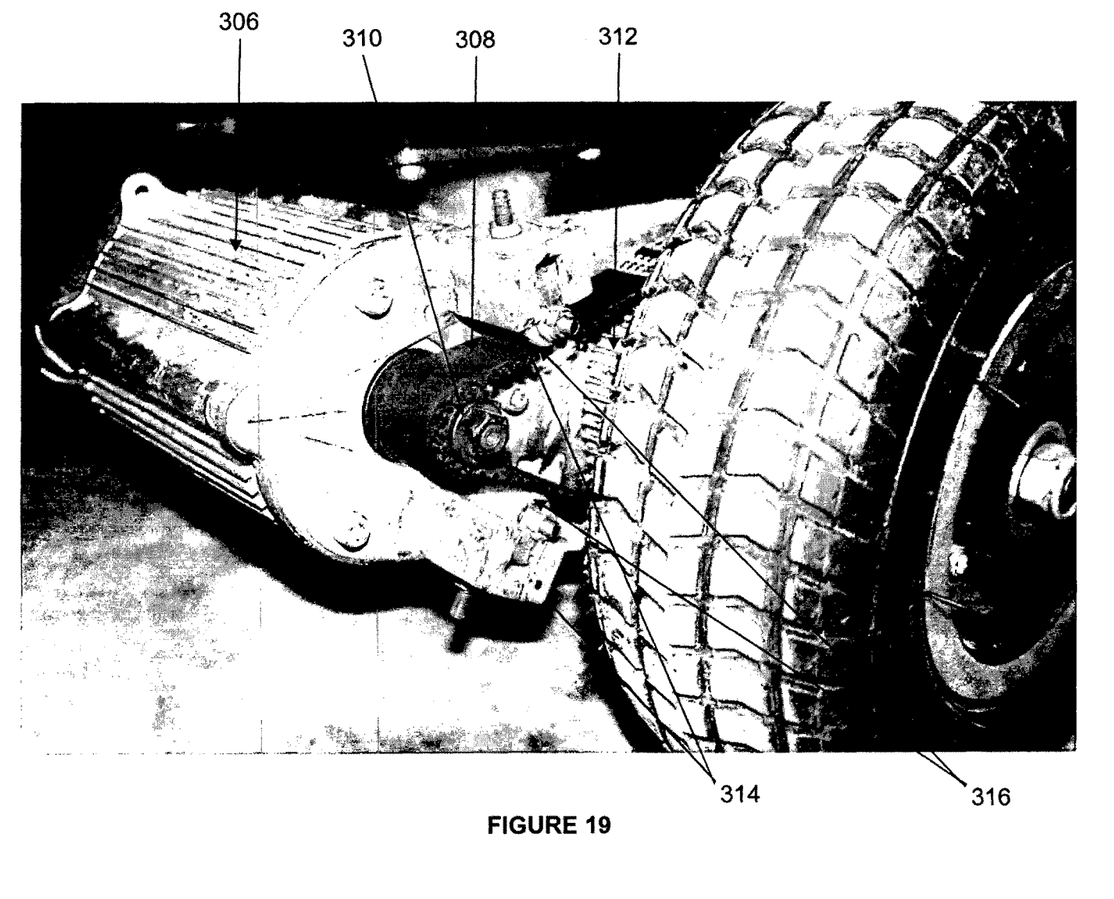
FIG. 19 is a close-up view of a belt tensioning system of the drive system of the vehicle shown in FIG. 1.

FIG. 19 illustrates a close up of the drive belt 308 which mechanically connects a rotor 310 of the motor 306 with a drive portion of the rear axle 222 in the form of a sprocket 312. The rotor and sprocket have teeth that engage with corresponding teeth on the belt 308. A belt tensioning system is provided which includes two protruding members in the form of a lug 314 with an adjustable height roller 316. Each lug 314 is located such that the rollers 316 urge the drive belt 308 against the rotor 310 of the motor 306 and the sprocket 312 of the rear axle 222.

In use, an operator of the vehicle 10 stands on the deck 100 and operates the wireless remote 172 to move forward and backward. The vehicle 10 is turned by the operator leaning to the left or right, typically by holding the knob 174 on the support pole 142 which not only assists the operator with stability but also provides greater turning power. The operator can also carry a load, such as a full size golf bag (not shown), which is secured on the vehicle 10. This provides the operator with an easy transportation system for themselves and their belongings, particularly on off-road terrain.

In a golfing environment, the vehicle 10 provides a golf player with a quick and efficient transport system between holes and to their ball. As each player has their own vehicle they can all travel individually, such as to their own balls simultaneously, which reduces unnecessary waiting and travelling.

The wheels 120, 122 have a wide high grip tread which provides the necessary traction in off-road environments, but also spreads the load evenly over a large area which has less impact on turf than a players feet.

Should a vehicle 10 run out of power or break down, the collapsible nature of the vehicle 10 allows it to be easily transported without the need for a trailer or large vehicle. Although relatively heavy, the vehicle can be carried. Alternatively, it can be placed in the boot of a car. This advantageously allows players to have their own vehicle which is easily transported to or from the golf course.

Although the invention has primarily been described as being electric, it will be appreciated that other forms of power could be used such as could be used, such as petrol, or the like.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A vehicle operated by an operator to carry a load, an item of baggage, or a golf bag, the vehicle comprising:
    a deck upon which the operator can stand in operating the vehicle;
    a steerable front skateboard truck mounted to an underside of the deck;
    a steerable rear skateboard truck mounted to the underside of the deck;
    a seat assembly, upon which the operator can sit, located rearward and below the deck,
    wherein the front skateboard truck and the rear skateboard truck are steered by the operator moving their weight from side to side;
    a front pair of wheels mounted to the front skateboard truck;
    a rear pair of wheels mounted to the rear skateboard truck, wherein the front pair of wheels and the rear pair of wheels are substantially inline;
    a drive system mounted underneath the deck;
    an energy storage system that provides power to the drive system; and
    a frame mounted to the deck, wherein the frame is configured to secure the load, the item of baggage, or the golf bag to be carried by the vehicle, and wherein a portion of the frame is engageable by the operator in operating the vehicle, wherein the portion of the frame engageable by the operator in operating the vehicle comprises a member being held by the operator and being used for at least partially steering the vehicle by the operator standing on the deck moving their weight from side to side and the operator leaning on the member.

2. The vehicle of claim 1, wherein the vehicle is an electric vehicle with the drive system comprising an electric drive system and with the energy storage system comprising an electrical energy storage system.

3. The vehicle of claim 1, wherein the drive system comprises a motor and a drive belt, wherein the drive belt engages directly with a rotor of the motor and a drive portion of a wheel axle between two of the wheels.

4. The vehicle of claim 3, wherein the rotor and drive portion of the wheel axle have teeth and the drive belt has corresponding teeth that engage with the teeth of the rotor and drive portion of the wheel axle.

5. The vehicle of claim 3, wherein the drive system comprises a belt tensioning system.

6. The vehicle of claim 5, wherein the belt tensioning system is adjustable.

7. The vehicle of claim 5, wherein the belt tensioning system includes at least one protruding member that engages with the belt between the rotor and the drive portion of the wheel axle.

8. The vehicle of claim 7, wherein the protruding member is a roller that can rotate when the belt moves.

9. The vehicle of claim 1, wherein the frame carries the load, the item of baggage, or the golf bag on the vehicle.

10. The vehicle of claim 1, wherein the frame comprises a base and a support member.

11. The vehicle of claim 10, wherein the base is mounted on an upper surface of the deck and has a flange portion.

12. The vehicle of claim 11, wherein the flange portion extends around at least a portion of the perimeter of the base.

13. The vehicle of claim 10, wherein the support member extends substantially perpendicularly from the base or from the deck adjacent the base.

14. The vehicle of claim 10, wherein the support member has a support bracket that extends transversely to the support member.

15. The vehicle of claim 14, wherein the support bracket is adapted to engage with the load, the item of baggage, or the golf bag.

16. The vehicle of claim 10, wherein a fastener is attached to the support member.

17. The vehicle of claim 16, wherein the fastener is an adjustable length strap with a releasable clip.

18. The vehicle of claim 10, wherein the support member comprises a hinge assembly near the base with a releasable locking mechanism.

19. The vehicle of claim 10, wherein the portion of the frame engageable by the operator in operating the vehicle comprises a knob disposed on the support member, the knob being held by the operator and being used for at least partially steering the vehicle.

20. The vehicle of claim 1, further comprising an electronic controller.

21. The vehicle of claim 20, wherein the electronic controller is a wireless controller.

22. The vehicle of claim 20, wherein the electronic controller communicates digitally with a receiver in electronic communication with the drive system to transmit signals that control the drive system.

23. The vehicle of claim 20, wherein the electronic controller utilizes a unique identifier.

24. The vehicle of claim 1, wherein the underside of the deck has stops adjacent the steerable front skateboard truck.

25. The vehicle of claim 1, further comprising one or more of: a seat, a drink holder, an umbrella holder, a scorecard holder, a ball holder, a tee holder, a bucket holder, a control panel, a thermally insulated compartment, forward lighting, brake lighting, and mudguards.

26. The vehicle of claim 1, wherein the seat assembly comprises a cold box with a seat integrally formed with a lid of the cold box.

27. The vehicle of claim 1, wherein the energy storage system includes a battery housed within a casing mounted to the underside of the deck, wherein the casing has a quick release mechanism that allows access to the battery.

* * * * *